Figure 1:
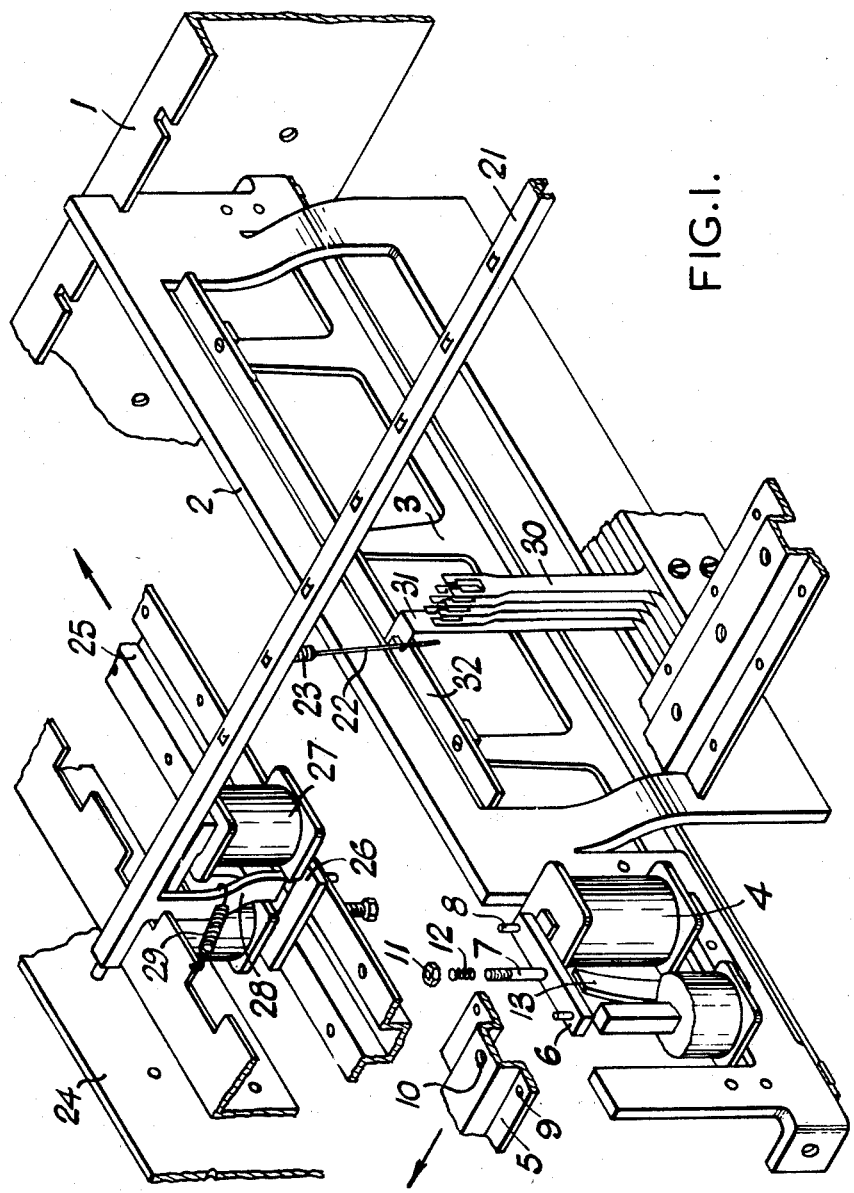

May 10, 1960  G. T. BAKER  2,936,339
TELEPHONE OR LIKE SYSTEMS
Filed May 26, 1953  11 Sheets-Sheet 1

FIG.I.

Inventor George Thomas Baker
by Dearson Stunsberg
Attorney

May 10, 1960   G. T. BAKER   2,936,339
TELEPHONE OR LIKE SYSTEMS
Filed May 26, 1953   11 Sheets-Sheet 2

Inventor George Thomas Baker
by Herve Murphy
Attorney

May 10, 1960  G. T. BAKER  2,936,339
TELEPHONE OR LIKE SYSTEMS
Filed May 26, 1953  11 Sheets-Sheet 3

Inventor George Thomas Baker
by Desmor Steinbey
Attorney

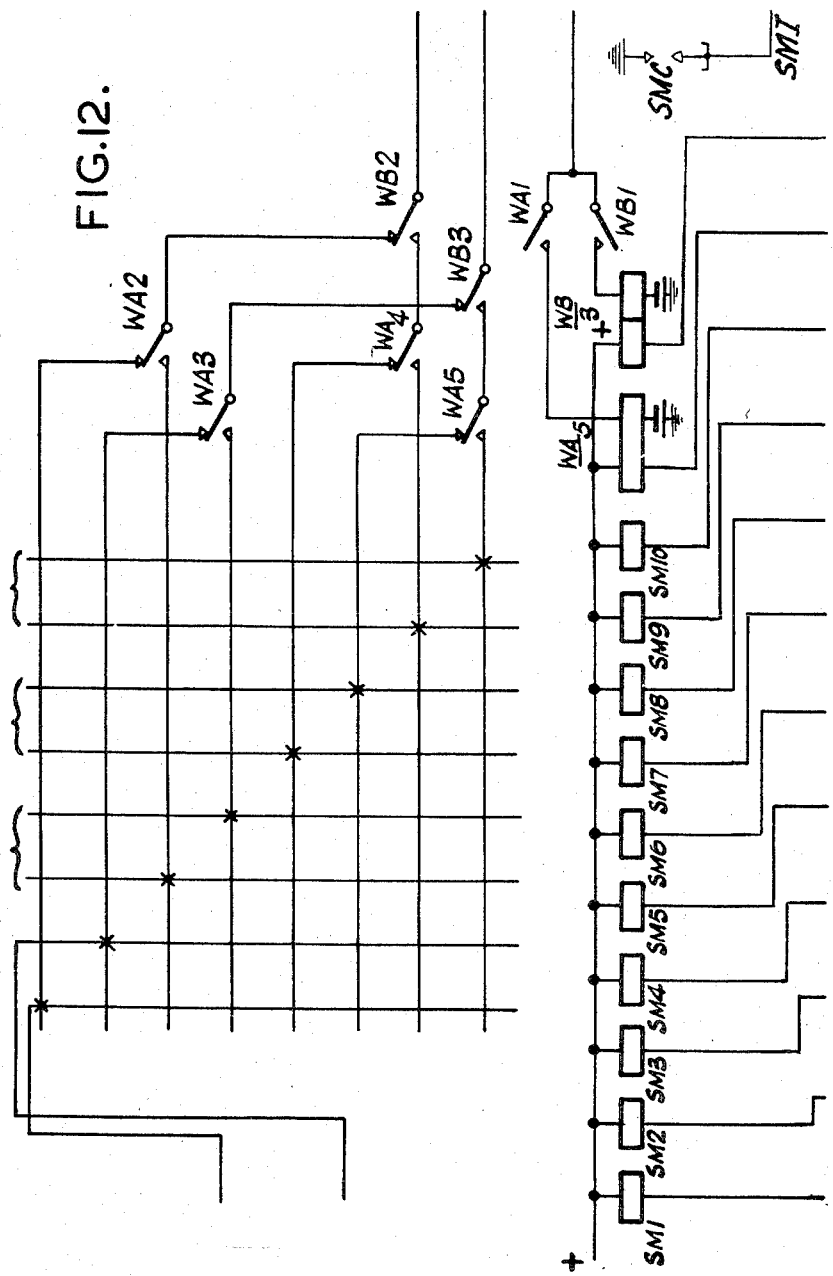

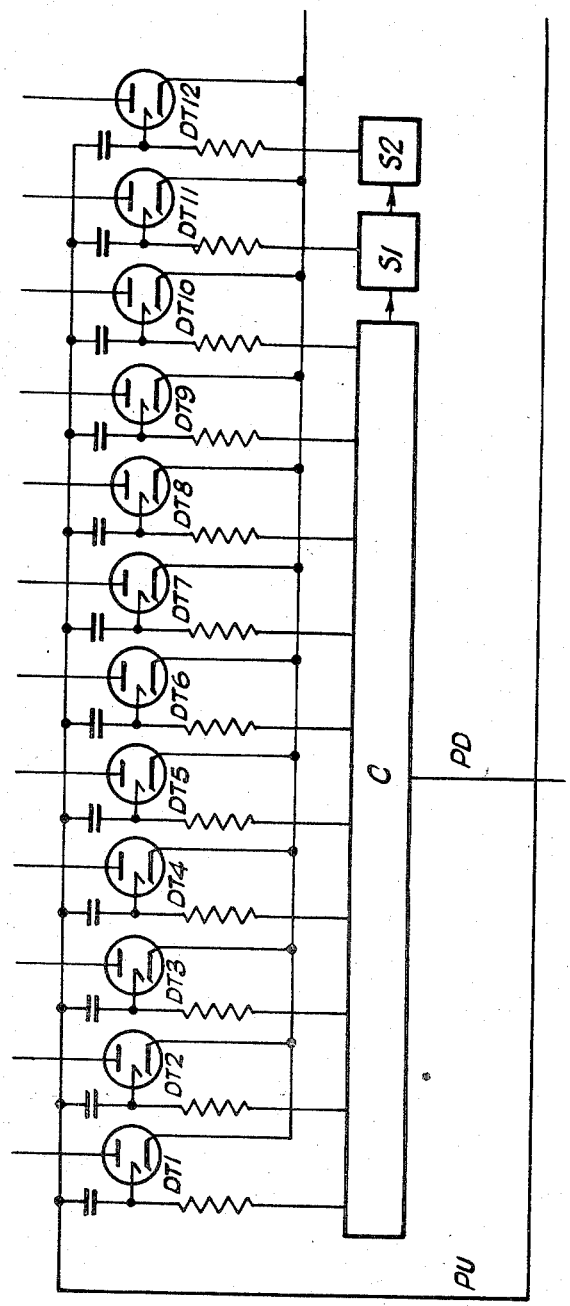

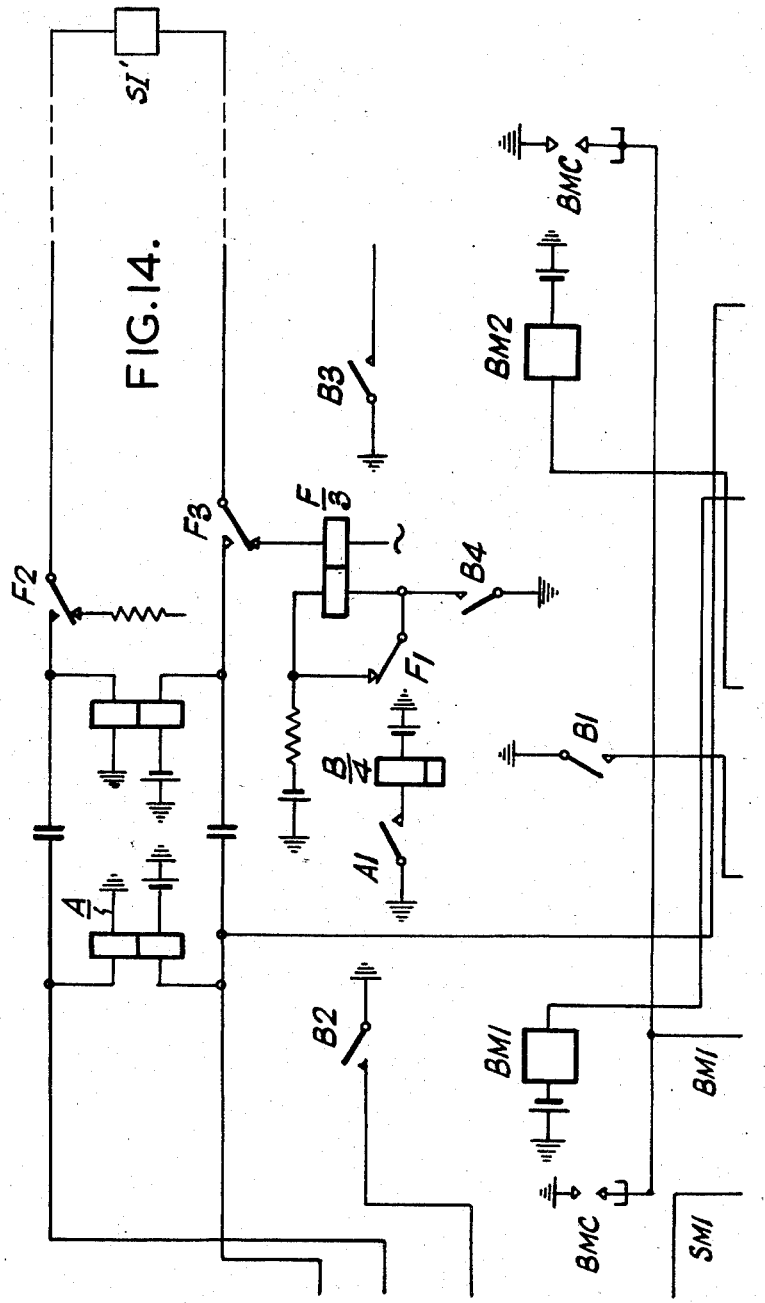

May 10, 1960  G. T. BAKER  2,936,339
TELEPHONE OR LIKE SYSTEMS
Filed May 26, 1953  11 Sheets-Sheet 11

INVENTOR
George Thomas Baker
BY
ATTORNEY

United States Patent Office 2,936,339
Patented May 10, 1960

2,936,339
TELEPHONE OR LIKE SYSTEMS

George Thomas Baker, Taplow, England, assignor to British Telecommunications Research Limited, Taplow, England, a British company Application May 26, 1953, Serial No. 357,474

Claims priority, application Great Britain May 27, 1952

17 Claims. (Cl. 179—18)

The present invention relates to telephone or like telecommunication systems and is more particularly concerned with systems employing so-called crossbar switches or their equivalent, that is to say switching devices in which a connection can be set up by the closing of contacts at a particular point in what may be thought of as a coordinate system of wires, the point being selected in accordance with some controlling circumstance, for instance digits dialled by a calling party or the availability of the different connecting paths.

Present arrangements of automatic telephone systems are such that a connection is set up in response to impulses dialled by the calling party which either directly operate the switches in the speaking route or are transmitted to a register device which is normally taken into use only for the period required and in response to its setting produces appropriate trains of impulses or selective switching impulses to set the switches in the speaking route.

The general object of the present invention is to provide an arrangement capable of setting up connections over crossbar switches more rapidly and with a reduction in the amount of equipment required, and though in the following description the standard arrangement using dialled impulses is assumed, the principles are applicable to other methods of transmitting information from calling parties.

A feature of the invention is that in a telephone or like system employing automatic switches of the crossbar type, the information for effecting the selective operation of the switch is registered on a device of the magnetic drum type from which control of the various magnets of the switch is effected.

Though the use of a magnetic drum gives a very convenient arrangement certain aspects of the invention are not limited to such use. It should be mentioned that the expression "magnetic drum" is intended to include a disc or endless tape though these forms would probably not be so satisfactory in practice.

Figure 7:
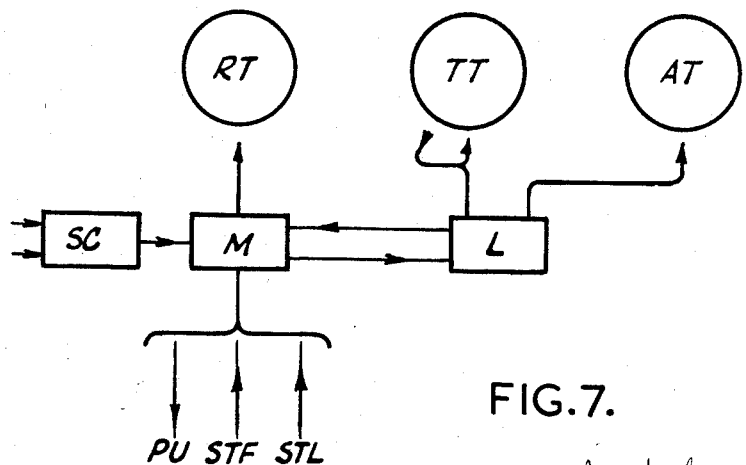
Figure 8:
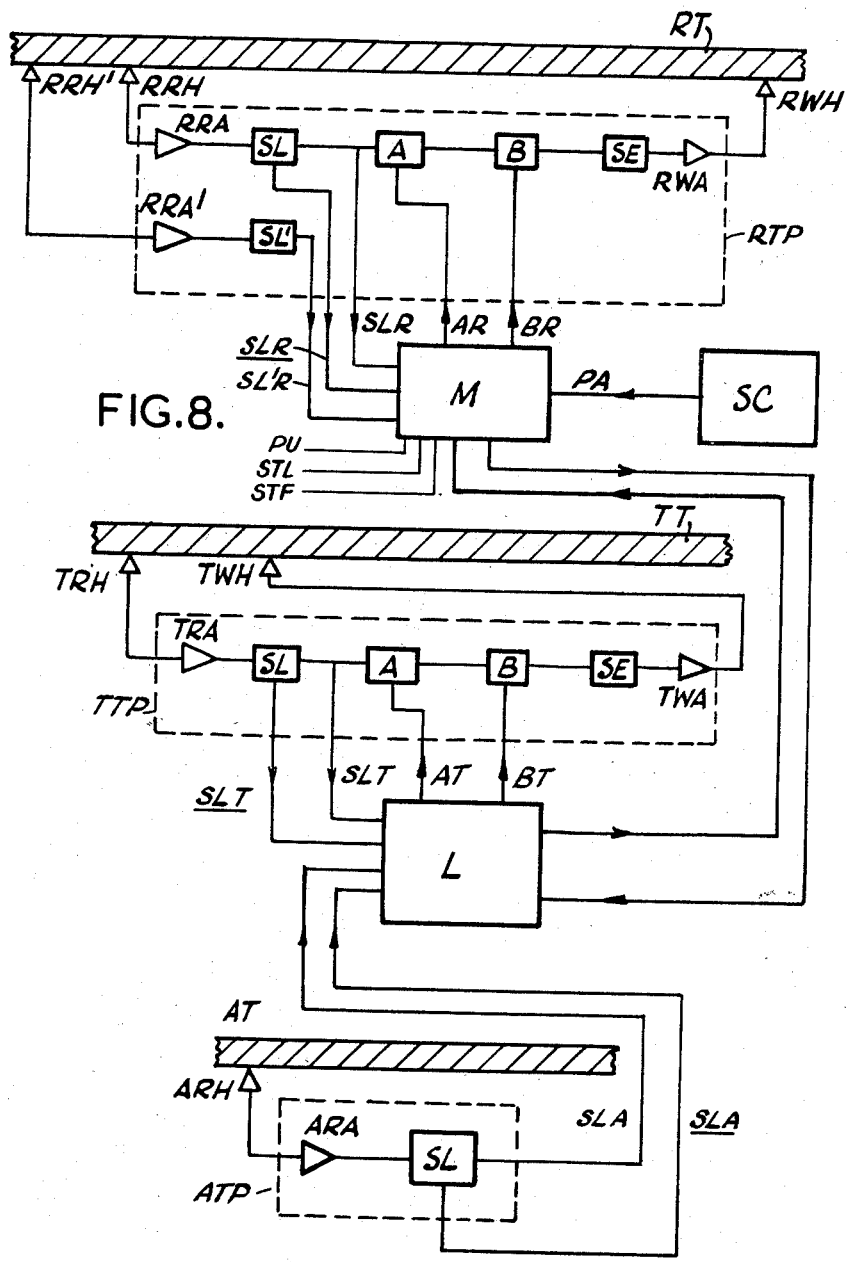
Figure 9:
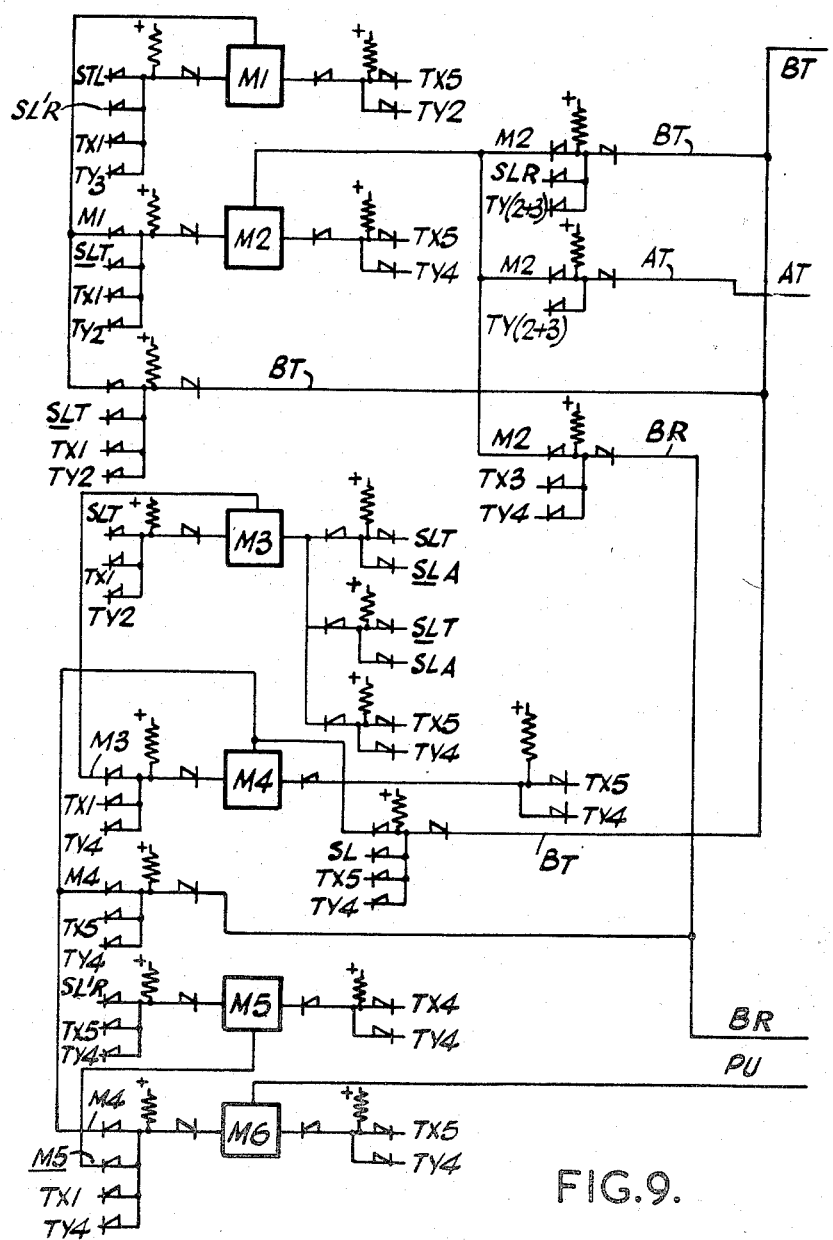
Figure 10:
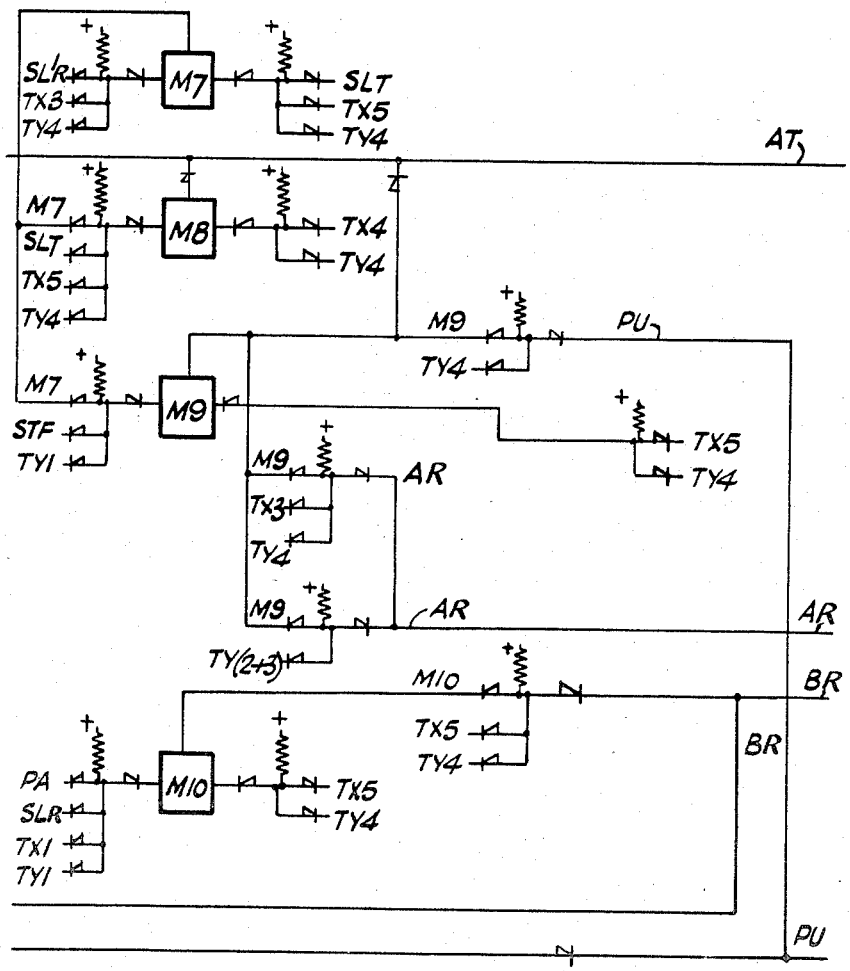

The invention will be better understood from the following description of one method of carrying it into effect which should be taken in conjunction with the accompanying drawings comprising Figs. 1–15. Of these Figs. 1–6 show in diagrammatic form the mechanical details of the crossbar switch, Fig. 1 indicating the general layout and method of operation, while Figs. 2–6 indicate the various possible positions of the co-operating members in order to produce the necessary contact closure. Figs. 7 and 8 indicate the general layout of the control equipment associated with the magnetic drum which could be located an appreciable distance away from the equipment of Figs. 11–15. Figs. 9 and 10 show the detailed circuits for the control of the magnetic drum and these figures show, by means of the usual circuit diagrams, the equipment involved in the speaking route and the auxiliary apparatus immediately associated therewith.

It will be convenient to describe the arrangement first of all in general terms. It is assumed that the system being described caters for 40 subscribers so that all the traffic can probably be catered for by means of two crossbar switch mechanisms, one acting as a finder and the other as a connector or final selector. It will be understood however that the principles of the invention are equally applicable to larger systems. Control of the operation is assumed to be effected by a high-speed storage device of the magnetic drum type comprising essentially a cylinder having a uniform magnetic surface and arranged to be continuously rotated about its axis at a substantially constant speed. The storage of information is effected by the selective magnetisation of unit areas which form circumferential tracks having co-operating therewith a writing head and one or more reading heads. The circuits of the drum are arranged to deal with the different conditions of the subscribers' lines so that it is not necessary to provide individual line and cut-off relays.

The crossbar switch itself is of what may be termed the reverse drive type, the advantage of which is that no magnets need to remain operated during the existence of a connection, a momentary operation permitting the necessary setting up operation and a further momentary operation subsequently effecting release.

It is also contemplated that the crossbar switch shall be of the so-called servo-operated type by which is meant that the main source of power for effecting the necessary switching operations is provided in common for all the required operations of one switch and possibly for a plurality of switches and the individual magnets only exercise a coupling function so that they may be quite small and do not involve any serious current drain. This method of operation is rendered possible by the use of the reverse drive principle since both the so-called hold and select magnets are only operated momentarily and the number of magnets operated at any one time is comparatively small and hence the motive power can be reduced accordingly by making use of this diversity.

This common source of power may take the form of a bar to which is imparted reciprocating longitudinal movement by means of an electromagnet or a rotating cam. This movement may be continuous but preferably is only initiated when one or more of the bars require to be moved. Projections on this bar normally move adjacent to but clear of the bridge operating arms or select fingers it is desired to operate. A movable finger or projection under control of a coupling magnet is adapted to be interposed between a projection on the bar and a member which it is desired to operate. If this finger is operated during the next movement of the bar in the required direction, the appropriate member is coupled to the bar and hence the movement of the bar is imparted thereto.

It will be convenient to consider first the mechanical construction as shown in Figs. 1–6. The crossbar switch follows the general principles of such switches in that the incoming and outgoing leads may be thought of as crossing on a co-ordinate basis and selective means are provided for effecting connections at the required intersection by closing suitable sets of contact springs. One set of co-ordinates is represented by a plurality of links or bridges in the switch and associated with each of these is a bridge operating member which in usual constructions is controlled by a bridge or hold magnet. For the other set of co-ordinates, which may be represented by subscribers' lines, there is also an operating member carrying a plurality of select fingers, one corresponding to each bridge. In some arrangements economy is secured by providing a select finger common to two bridges and arranging for the operating members to displace the select fingers in one or other direction but this feature is not incorporated in the arrangement shown.

The arrangement generally adopted is that the operating arm for the select fingers is first operated by one of the select magnets, thereby interposing each of the associated fingers between the appropriate contact operating members and the respective bridge operating arms. A particular one of these latter is then operated and this co-operates with the proper select finger to close that particular set of contacts. The select magnet is then released and since the fingers are flexibly mounted, the one associated with the bridge operating arm which has been moved is trapped and remains out of its normal position while the others restore to normal and are available for co-operation with other bridge operating arms. When the particular connection just made is to be released, the hold magnet is de-energised and this enables the trapped finger to move clear and to line up with the remaining unoperated fingers. The present switch operates in a slightly different manner as will appear from the detailed description which will now be given.

Considering now Fig. 1, it will be appreciated that this only shows one operating arm for each co-ordinate in order to bring out the principle of operation more clearly. The main frame member is indicated at 1 and between this and its corresponding member (not shown) at the other end of the switch are mounted a plurality of bridge frames 2. Each of these carries a pivoted bridge operating arm 3 which is movable under the control of a coupling electromagnet 4 and is normally held in the position indicated by a restoring spring (not shown). At right angles to the bridge frames is mounted a common operating member 5 which is continuously reciprocated longitudinally in the manner indicated by the arrow. Associated with each bridge frame such as 2 and co-operating with the corresponding coupling magnet is an armature 6 provided with a stem 7 and two vertical guide members 8. The guide members engage in holes 9 in bar 5 and the stem 7 passes through a further hole 10 and is secured by a nut 11 on the stem 7 with a spring 12 between the nut and the upper surface of the bar 5. The armature 6 accordingly travels to and fro with the bar 5 but is capable of vertical movement on the guides 8 and stem 7. The bridge operating arm 3 is provided with a projection 13 which is normally clear of the armature 6. If however the coupling magnet 4 is energised, the armature 6 is attracted and in its reciprocating movement will engage the arm 13 so that the bridge operating arm 3 is moved.

A somewhat similar arrangement serves to control the finger operating arm 21. Such an arm is provided for each of the subscribers' lines or incoming connections and this arm is provided with a finger such as 22 for each bridge. These fingers are mounted by way of springs 23 to give the necessary flexibility and the bar 21 is pivoted in the end plates 24. In this case also there is a common driving member 25 which is given continuous reciprocating movement in a longitudinal direction as indicated by the arrow and to this are secured the appropriate number of armatures 26, each co-operating with a coupling magnet such as 27. The bar 21 is provided with an operating arm 28 which normally clears the path of movement of the armature 26. When the magnet 27 is energised however, the armature is moved so as to engage the arm 28 and rotate the bar 21 against the tension of the restoring spring 29 so that the fingers are deflected.

Figure 2:
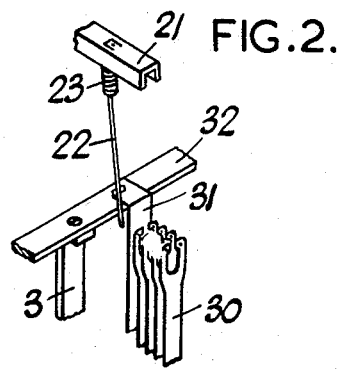

The co-operation of the bridge operating arm with the fingers to produce the necessary contact operation will be appreciated more clearly from Figs. 2–6. Fig. 2 shows the normal or unoperated position, in which the contact springs 30 are not operated and the control spring 31, which is notched in the manner shown, may be resting against the bar 32 on the bridge operating arm while the finger 22 is slightly deflected by the bar. If the bar 21 should be operated to effect the setting up of a connection over some other bridge, the finger 22 will engage the spring 31 and flex on its mounting but no further operation will be produced.

Figure 3:
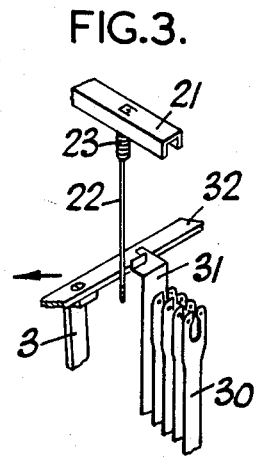
Figure 4:
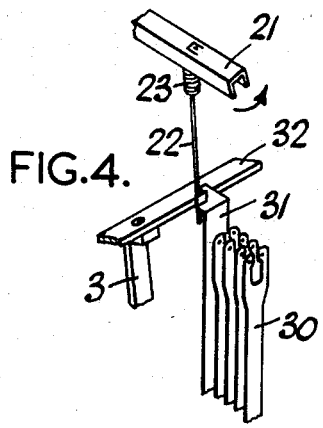
Figure 5:
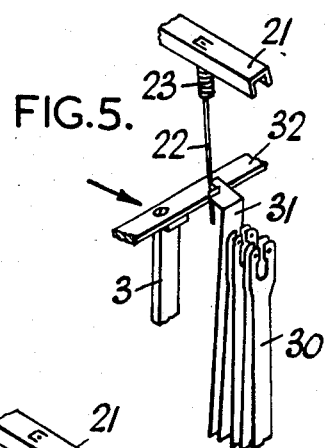
Figure 6:
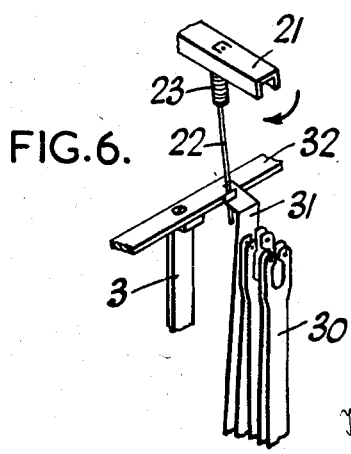
Figure 11:
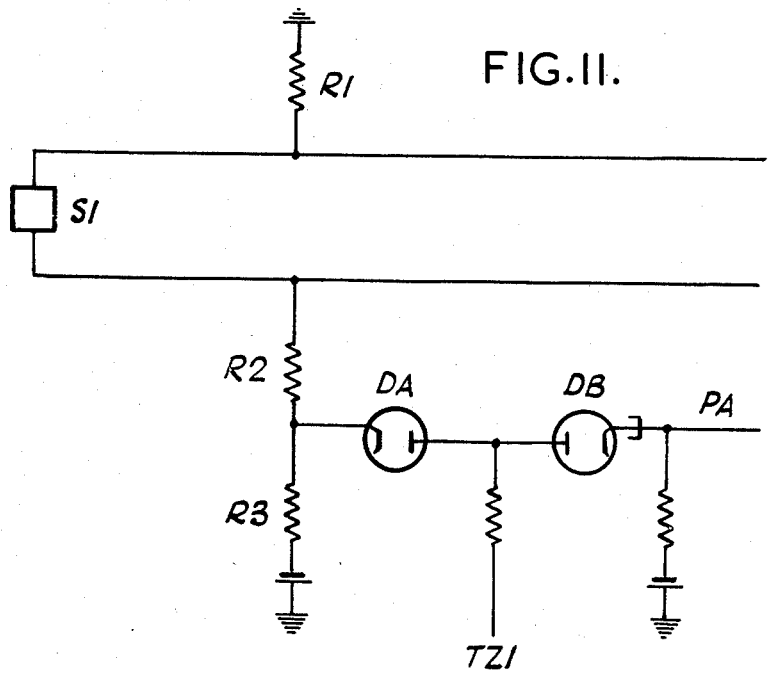

When the springs 30 shown in Figs. 2–6 are to be operated, the bar 32 will be moved to the left in the manner indicated by the arrow in Fig. 3 owing to the coupling magnet 4 effecting connection with the common drive member 5 shown in Fig. 1. The finger 22 will then follow the bar 32 until it occupies an undeflected position. The select finger operating bar 21 will then be rotated as indicated by the arrow in Fig. 4 so that the finger 22 is inserted between the spring 31 and the bar 32 as shown in Fig. 4. Thereupon the bar 32 is returned to its normal position as shown in Fig. 5 and owing to the interposition of the finger 22, the springs 30 are now operated. When the conditions of Fig. 6 are reached by the return of the bar 21 to its normal position, the finger 22 is trapped between the bar 32 and the spring 31 and is held by friction, thereby maintaining the contacts operated. If it were found necessary to secure reliable operation a small projection could be included on the spring 31 to prevent undesired release of the finger.

The bridge operating member will not again be moved until it is desired to release the connection and when it is again moved to the left by the energisation of the coupling magnet 4, the finger 22 is enabled to spring clear of the spring 31 and the contacts are opened. The finger is then again deflected as in Fig. 2 on the return of the bar 32 to its normal position.

If the bar 32 is moved to set up some other connection, the finger 22 will follow its movement but the finger will only become effective to close the contacts if its operating bar 21 also is operated as just described.

Considering now the general operation of setting up a connection using the switch just described, it is assumed that control is effected from the magnetic drum which is provided with three tracks, a register track which includes a portion assigned to each subscriber concerned, a transfer track which is normally empty and may be used by any subscriber as required and an address track. In each track there are assumed to be 40 sections around the circumference corresponding to 40 different subscribers and each of these comprise four blocks each of five unit areas. The address track contains permanent information relating to the subscribers' numbers and only the second and third blocks are employed. The sections representing different subscribers are selected by TZ clock pulses, the various blocks by TY clock pulses and the various unit areas by TX clock pulses. This nomenclature is that adopted in the co-pending application of G. T. Baker, Serial No. 300,431, filed July 23, 1952, now Patent No. 2,805,286, which discloses in detail the arrangement assumed to be employed whereby digits dialled by a calling party are registered on the drum. The address track requires only a reading head since the information stored therein is not altered during normal operation. The two further tracks however, the register track and the transfer track are each provided with a reading head and a writing head and the register track in addition has an auxiliary reading head located one group ahead of the regular reading head for a purpose which will become apparent as the description proceeds. The transfer track only stores information corresponding to one group which is repeated round the track, conveniently by arranging that the reading head is located one group ahead of the writing head.

The control circuit is shown diagrammatically in Fig. 7 and in block schematic form in Fig. 8, RT representing the register track, TT the transfer track and AT the address track. Fig. 7 indicates that the drum MD is driven by an electric motor MT so as to have a substantially constant speed. The control equipment includes a unit M which will be referred to as a manipulator and a unit L which will be referred to a locator, this latter apparatus being particularly concerned with the transfer and address tracks. This concept of two separate units M and L arises from consideration of the functions which they perform but in practice they are not readily separable and they are jointly constituted by the equipment illustrated in Figs. 9 and 10. A scanner SC is also provided having access to the various subscribers' lines and arranged to forward to the manipulator at appropriate time periods any information relating to the condition of the lines, for instance the initiation of a call or the transmission of setting impulses. From the manipulator there extend to the equipment shown in Figs. 11–15 three control leads, a lead PU over which an impulse is transmitted at a selected instant of time to effect the setting up of the switches and two leads STF and STL to which potential is connected from Fig. 15 when the operation of the manipulator is required in order to bring about a particular desired switching operation.

From the somewhat extended diagram in Fig. 8 where the tracks are shown developed it will be appreciated that the register track is provided with a reading head RRH, a writing head RWH and an auxiliary reading head RHH' which is spaced ahead of the regular reading head by a distance equal to one subscriber's section. As shown in Fig. 7, this indicates, though not strictly to scale, how the circumference of the drum may be considered as divided up into 40 sections corresponding to the different subscribers. The output of the reading head RRH passes to a track panel RTP including a reading amplifier RRA and the equipment SL which may be described as a pulse shaper for signals extracted from the store. A in the track panel represents the circuit for writing "0" and B the circuit for writing "1" and following the usual practice it is arranged that if both these circuits are operative together, the B circuit predominates. The equipment SE is a pulse shaper for signals entering the store and RWA is a writing amplifier feeding the writing head RWH. Similar equipment RRA' and SL' is provided for the auxiliary reading head RRH'. Fuller details of this equipment are given in the co-pending application of G. T. Baker, Serial No. 300,429, filed July 23, 1952.

The transfer track is provided with a writing head TWH and reading head TRH which are spaced apart a distance equal to one subscriber's section whereby owing to regenerative action the effect of repeating the information round the drum is produced. The transfer track panel TTP includes reading and writing amplifiers TRA and TWA and the equipment SL, A, B, and SE as on the register track panel RTP. The address track AT needs only for normal operation a reading head ARH, the output of which passes by way of an amplifier ARA to a pulse shaper SL mounted on a track panel ATP.

The control exerted by the drum is conveniently carried out by the use of so-called memory circuits. Each of these comprises a thermionic toggle of the Eccles-Jordan type having two stable positions. One of these will be considered as the normal position and the memory circuit may be changed over to its operated position by an operating pulse and subsequently restored to its normal position by a reset pulse. In its operated position it provides the output normally required but in some cases use is made of the output available when it is in its normal position. A typical circuit is disclosed in the co-pending application of G. T. Baker, Serial No. 300,429, filed July 23, 1952, just mentioned. In Figs. 9 and 10 where the memory circuits are indicated by rectangles, the convention is adopted that the circuit is set by potential applied from the left and reset by potential applied from the right, while the normal (unoperated) output is taken from the bottom and the operated output from the top of the rectangle. The normal output is indicated by underlining the associated reference and the output from the reading heads is referred to as SL when it represents a dot or 1 on the drum and SL when it represents a blank or 0, suitable suffixes being employed to distinguish different tracks.

The general method of operation is that, by means of a form of time distribution scheme, the various select magnets of the crossbar switch are connected up in turn so that the magnet operated will depend upon the point of time at which an operating pulse is transmitted. When the subscriber dials, the digits are recorded on the register track in the section assigned for his use and when dialling is completed the registration is transferred to the transfer track as soon as this becomes free. This registration representing the called number is then compared with each address in the address track in turn until correspondence is found which fixes the position of the wanted subscriber's section on the drum and a test is then made to ascertain whether the wanted subscriber is busy. If so, the normal connecting operation does not take place and the calling party may be connected to a common busy tone channel over one of the bridges of the crossbar switch or given the busy tone in some other manner. It may be pointed out that in these circumstances none of the ordinary switching equipment is taken into use and in similar manner difficulties arising through line faults and delays in dialling do not tie up the equipment so that smaller quantities can be used. This arises from the fact that the drum is always available to deal with any condition on any line.

If however the called party is free, connection is made to his line over the pre-selected bridge circuit and ringing is at once initiated. The equipment then, over a similar mechanism associated with the first, sets up connection to the calling party by circuits completed when markings are encountered in the calling party's section of the drum and as soon as the called party replies, conversation may take place. The bridge circuit supplies battery feed and controls the release of the connection in the usual way.

Considering now the detailed operation of the drum control circuits shown in Figs. 9 and 10, it should first be explained that in addition to the equipment shown therein further equipment including additional memory circuits is provided to enable the dialled impulses to be recorded on the drum in the form of binary digits. The first block of each section of the register track is used for this purpose and the two digits concerned are registered in the second and third blocks. It is assumed that this is done in the manner shown in the prior the co-pending application of G. T. Baker, Serial No. 300,431, filed July 23, 1952, now Patent No. 2,805,286, and the present description will deal only with the additional equipment required. When a subscriber calls, positive is connected to lead PA, Fig. 10, in a manner which will be apparent from Fig. 11 which will be described shortly. This potential is arranged to mark a dot in the first position of the first block on the register track corresponding to that subscriber. Accordingly the coincidence circuit PA, SLR, TX1, TY1 comprising rectifiers and a resistor connected in known manner now effects the operation of memory circuit M10. This thereupon by means of a coincidence circuit M10, TX5, TY4 applies positive to lead BR and thus inserts a dot in the fifth position of the fourth block as a busy marking and is then reset over TX5, TY4.

Figure 15:
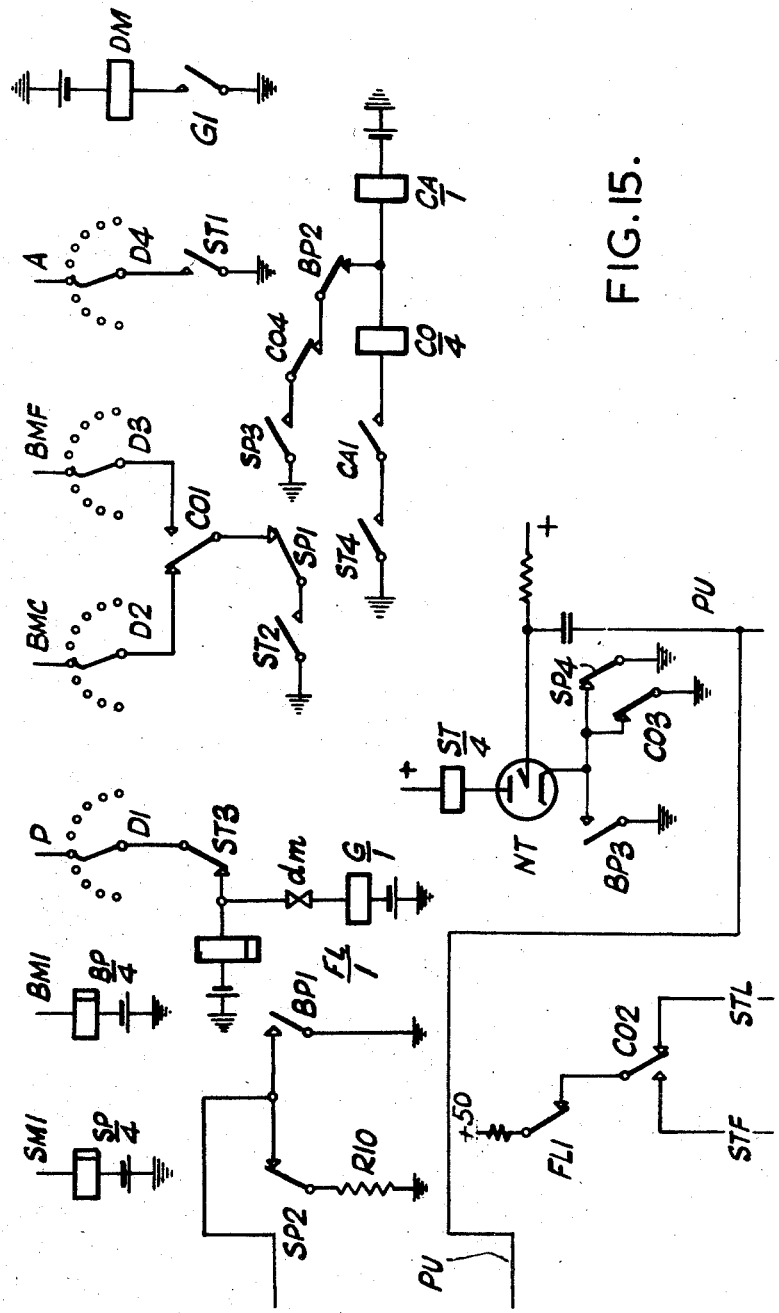
Figure 7:
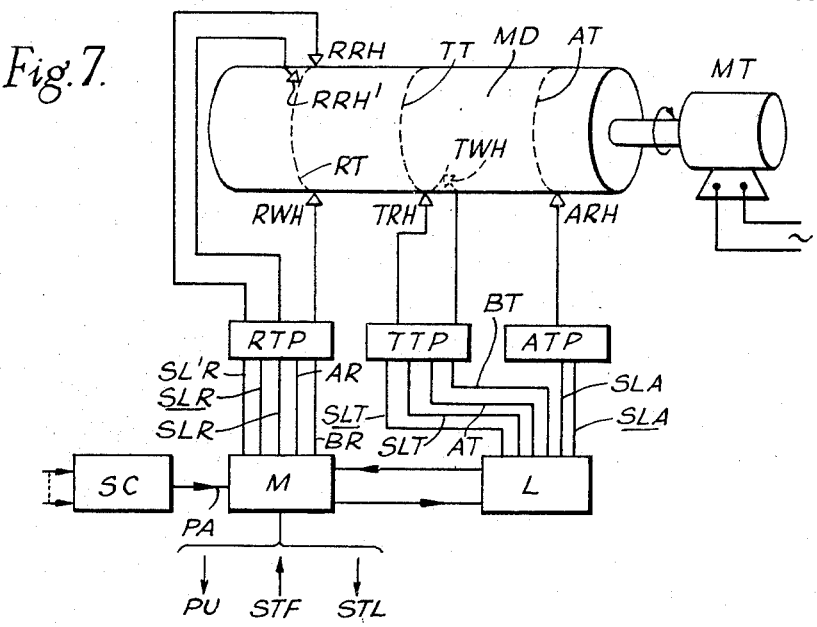
Figure 11:
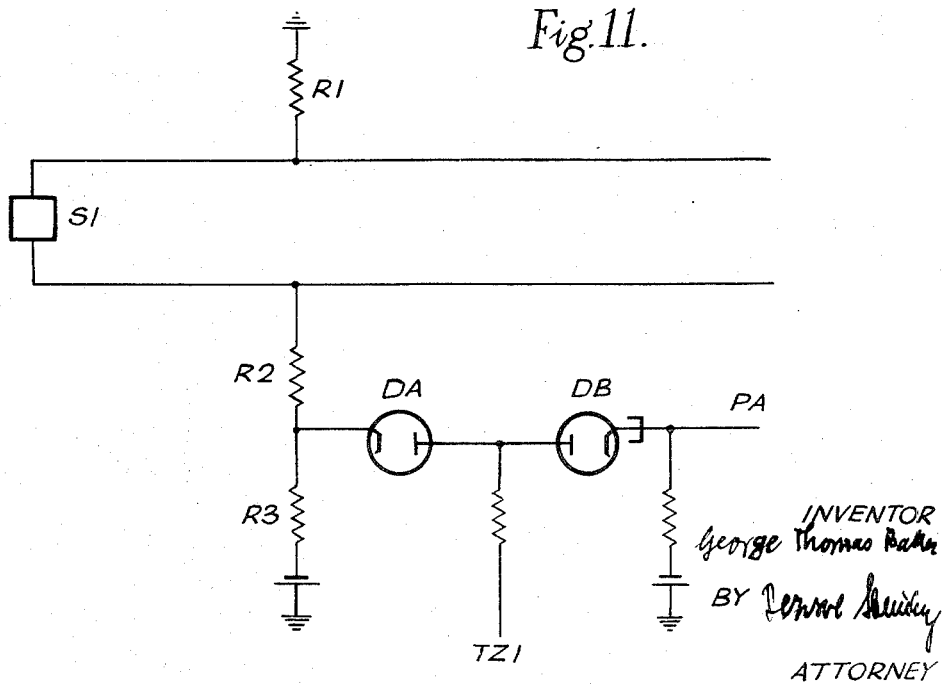

As a result of the dialling operation, the called party's number is set up in binary form in positions 2–5 of blocks 2 and 3 of the calling party's section of the register track and a busy dot is written in to the first position in each of these blocks when registration of the respective digit is completed. Assuming that the distributor, Fig. 15, is ready at this time to control the setting up of this particular call, that is to say it is not dealing with any other subscriber, 50 v. positive will be connected to lead STL shown in Fig. 15 and accordingly when the auxiliary reading head RH' encounters the dot in block 3 which signifies the end of the second digit and hence the completion of dialling memory circuit M1 is operated in the coincidence circuit STL, SL'R, TX1, TY3. If the transfer track is in use by any other subscriber at this time, there will be a registration in position 1 of the second block and the operation of M1 is unable to produce any useful effect and it is reset by the coincidence circuit TX5, TY2 after remaining operated for a period corresponding to the scanning of a complete register. If the transfer track is free however, there will be no marking in the TX1, TY2 position and accordingly memory circuit M2 is operated in the coincidence circuit M1, SLT, TX1, TY2. As a result, the dialled digits are now transferred to the transfer track and this is effected by the usual connections to leads AT and BT as determined by memory circuit M2. Potential is applied to the lead BT over the coincidence circuit M2, SLR, TY(2+3), while potential is also connected to lead AT over the circuit M2, TY(2+3). As a consequence the markings from blocks 2 and 3 of the register of the subscriber concerned are transferred to the transfer track and any markings previously recorded are erased. As previously pointed out, owing to the spacing of the writing and reading heads for the transfer track only the distance of one register apart, the information is repeated round the whole circumference of the transfer track. Moreover, the coincidence circuit which brought about the operation of memory circuit M2, namely M1, SLT, TX1, TY2 also effects a marking in position 1 of the second block of the transfer track to constitute the busy indication referred to above. Memory circuit M2 is reset at the end of the register over the coincidence circuit TX5, TY4.

When the fourth block of the calling subscriber's group is reached, by which time the necessary transfer of the digits will have been made, a marking is inserted in position 3 therein on the subscriber's register track to indicate which subscriber is making use of the transfer track. This is done by the connection of potential to lead BR over the coincidence circuit M2, TX3, TY4.

When the busy dot which has been inserted on the transfer track is encountered by the reading head, memory circuit M3 is operated over the coincidence circuit SLT, TX1, TY2. Memory circuit M3 is used for controlling the comparison of the digits registered on the transfer track with the various addresses in the address track. As long as any difference is found, memory circuit M3 is repeatedly reset by one or other of the coincidence circuits SLT, SLA or SLT, SLA. When the required address is found however, neither of these circuits becomes operative and memory circuit M3 remains operated until the beginning of the fourth block and then operates memory circuit M4 over the coincidence circuit M3, TX1, TY4.

The operation of this memory circuit inserts a busy marking on the register track by connecting potential to lead BR over the coincidence circuit M4, TX5, TY4, assuming that the called subscriber was previously free. If he was busy, the existing marking would have already operated memory circuit M5 over the coincidence circuit SL'R, TX5, TY4 when this marking was encountered by the auxiliary reading head. The operation of M5 in these circumstances prevents the subsequent operation of memory circuit M6 the function of which is to produce the pulse for operating the connector switch as will shortly be described. Moreover, the busy marking produces a corresponding marking on the transfer track by connecting potential to lead BT over the coincidence circuit M4, SLR, TX5, TY4. Memory circuits M3, M4 and M5 are reset during the scanning of the fourth block, M3 and M4 by the coincidence circuits TX5, TY4 and M5 by the coincidence circuit TX4, TY4.

Assuming however, that the called subscriber is free, memory circuit M6 is operated over coincidence circuit M4, M5, TX1, TY4 and thereupon applies a pulse to the PU wire extending to the equipment of Figures 13 and 15 to cause the final selector switch mechanism to connect with the called party's line in a manner which will be dealt with subsequently. The connection to the PU wire is only momentary since memory circuit M6 is reset in position TX5, TY4. It will be appreciated that since this pulse is sent in a position dependent on the called subscriber's address, it serves to select his line by causing the striking of the appropriate gas discharge tube which is primed as will be described shortly in connection with Fig. 13.

It is now in order to effect the operation of the finder crossbar switch mechanism to extend the connection back to the calling party who is at present marked by the dot in position TX3, TY4 of his section of the register track.

When the auxiliary reading head encounters this dot, memory circuit M7 is operated over the coincidence circuit SL'R, TX3, TY4 but is almost immediately reset if the called subscriber is busy owing to the busy dot in position 5 of the fourth block on the transfer track. As may be seen from Figure 10, the coincidence circuit concerned is SLT, TX5, TY4. Moreover, in these circumstances, memory circuit M7 serves to operate memory circuit M8 over the coincidence circuit M7, SLT, TX5, TY4 and memory circuit M8 then applies potential to lead AT to clear the transfer track and is reset by the coincidence circuit TX4, TY4 in time for use by the next register if necessary.

Assuming however that the called subscriber was found to be free and that conditions are satisfactory for the setting of the final switch, there will be 50 volts positive on lead STF in Figure 15 and accordingly memory circuit M9 is operated over the coincidence circuit M7, STF, TY1. On the operation of memory circuit M9, potential is connected to the lead PU over the coincidence circuit M9, TY4 throughout the fourth block and this serves in the manner about to be described to operate the finder to connect with the calling party's line. It will be understood that this potential is applied in the time interval corresponding to the scanning of the calling party's register and consequently effects the operation of the primed gas discharge tube or tubes of the set DT1—DT12 in the same way as for the connection to the called party. Memory circuit M9 also applies potential to lead AT to clear the markings in the transfer track, by connecting potential to lead AR over the coincidence circuit M9, TX3, TY4, erases the marking of the register track in position TX3, TY4 which has previously identified the calling subscriber and also erases the dialled number by connecting potential to lead AR over the coincidence circuit M9, TY(2+3) so that an unnecessary further attempt to establish this call is not made. Memory circuit M9 is reset over TX5, TY4.

It will be appreciated that the arrangement described above permits the use of a camp-on-busy feature. Thus each time the calling subscriber's register passes under the reading head he will obtain the use of the transfer track if it is free and examine the condition of the called subscriber. As long as the called subscriber remains busy, the transfer track is cleared after each test so that all the other subscribers have the opportunity of setting up a call before the same subscriber is tested again.

Considering now the detailed operation of the circuits shown in Figs. 11–15, it should be explained that the subscriber's line extending from his instrument SI is connected in the exchange on the one hand to earth by way of a resistor R1 and on the other hand to battery by way of resistors R2 and R3. The junction of resistors R2 and R3 is connected to the diode DA which extends to the oppositely poled diode DB and then to an input lead PA which is common to a plurality of subscribers and in the small exchange being considered might be common to all the 40 subscribers. The junction of the diodes is connected by way of a suitable resistor to a TZ time pulse which is different for each of the subscribers. This arrangement constitutes the scanner represented by SC in Figs. 7 and 8. As long as the line is not looped, the potential on the cathode of diode DA is such that no output is produced on lead PA. When the subscriber removes his receiver however, current flows through resistors R1, R2 and R3 and the potential on diode DA is altered. Until however there is a suitable potential on the time pulse lead TZ1 in the case of the subscriber shown, no ouput will be produced. This output is passed to the manipulator M, if necessary through an amplifier, and by means of suitable control circuits effects the registration of a number dialled by the calling party and controls the memory circuit M10 in Fig 10. It will be understood that metal rectifiers could be used in place of the diodes DA and DB.

Fig. 12 shows a portion of one bridge circuit including the ten select magnets SM1—SM10 common to all the bridge circuits which may be the coupling magnets illustrated in Fig. 1. It should be explained that crossbar switches are generally constructed so as to have at least eight pairs of contacts at each intersection and as with the system being described only the two speaking leads pass through the switch, each intersection is arranged to be capable of dealing with four subscribers the eight pairs of contacts at a single crossing point being those indicated by crosses in Fig. 12. This enables a single switch to deal with all the 40 subscribers of the system. The selection between the four subscribers dealt with at each intersection is effected by means of the relays WA and WB which are operated over the equipment shown in Fig. 13.

Fig. 13 indicates a set of twelve cold cathode gas discharge tubes DT1—DT12 which are common to the finder and final selector switches but are controlled from common equipment comprising a 10-point cyclic counter C followed by two scale-of-two counters S1 and S2 which control relays WA and WB. The counter is driven by pulses continuously applied to lead PD at a speed synchronised with the speed of rotation of the drum. As will be described in greater detail subsequently, the arrangement of the Fig. 13 equipment is that the tubes are primed in turn from the counter and at a particular point a pulse is transmitted over the lead PU from the control equipment to all the tubes. As a consequence only the tube which is primed at that instant is operated and hence selection takes place in accordance with the timing of the pulse. It will be appreciated that either, neither or both of the tubes DT11 and DT12 may be operated at the same time as one of the tubes DT1—DT10, the tubes DT11 and DT12 being primed from the respective scale-of-two counters S1 and S2.

Fig. 14 shows the battery feed and ringing equipment associated with one of the bridge circuits and it will be appreciated that the right-hand end of this circuit extends to one bridge of another switch which acts as a final selector and has a further set of ten select magnets. This switch will incorporate also a number of other bridges which are connected to the corresponding bridges of the finder switch. The number of such bridges need only be sufficient to carry the traffic but ten may be employed in the standard constructional form. A called subscriber's instrument is diagrammatically indicated at SI.

Fig. 15 indicates common distributing equipment including a rotary distributor D which is shown diagrammatically as a 10-point switch corresponding to an assumption of ten bridges but may be a uniselector of standard construction. The operation of setting up a connection over this equipment will now be described.

When it is ascertained that a complete number has been registered on the register track as shown by the insertion of the busy dot for the second digit and that the called party is free, a pulse is transmitted over lead PU, Fig. 15, by the sequence of operations leading to the operation of memory circuit M6. This pulse brings about the striking of the gas discharge tube NT and also by its timing causes the striking of the appropriate gas discharge tube of the set DT1—DT10 shown in Fig. 13 corresponding to the units digit of the called subscriber's number. At the same time one or both of the tubes DT11 and DT12 may be struck dependent on the tens digit of the called number as represented by the condition of the counters S1 and S2. Owing however to the inclusion of the high resistance R10, Fig. 15, in the circuit of the tubes, the magnet connected in series therewith cannot yet operate. Relay ST energises and at contacts ST1 applies earth to wiper D4, at contacts ST2 applies earth to wiper D2 and at contacts ST3 opens the hunting circuit for the distributor. It may be mentioned that the distributor serves in well-known manner to pre-select an idle bridge circuit, busy bridge circuits being marked with earth in the bank of wiper D1. This earth accordingly operates relay FL which at contacts FL1 opens the initiating circuit extending over lead STF or lead STL to the manipulator M. The earth picked up by wiper D1 also operates relay G in series with magnet interrupter contacts dm and this relay at contacts G1 energises magnet DM. Thereupon the circuit of relay G is opened and it therefore acts as an interrupter relay to cause the advance of the distributor wipers until wiper D1 no longer encounters earth and relay FL then releases.

The application of earth to wiper D4 energises relay A, Fig. 14, by way of its lower winding and it thereupon operates and energises relay B. This at contacts B1 busies the bridge circuit in the bank of wiper D1, at contacts B2 and B3 provides holding circuits for relays WA and WB in the finder and connector switches respectively and at contacts B4 prepares a holding circuit for relay F. The earth connection to wiper D2 energises the bridge magnet BM2 of the connector switch. This magnet it will be understood may be the coupling magnet shown in Fig. 1, which thereupon causes the bridge operating arm to be moved so as to permit all the various selecting fingers which are not in use to be moved by their respective magnets. On the full operation of magnet BM2 contacts BMC are closed to operate relay BP which thereupon at contacts BP1 short-circuits the resistor R10, at contact BP2 opens a point in the circuit of relay CO and at contact BP3 completes an alternative circuit for relay ST. The increased current through the ionised tube now permits the operation of the associated select magnet (not shown) of the connector switch which may be connected either in series or in parallel with its corresponding select magnet in the finder switch. The select magnet thereupon effects the operation of the appropriate finger into the slot prepared by the operation of the bridge magnet and when the select magnet has completed this movement earth is connected to lead SMI by contacts SMC to operate relay SP. This thereupon at contacts SP1 opens the circuit of the bridge magnet which accordingly de-energises and permits the bar to release and trap the operated select finger, at contacts SP2 opens the initial circuit for the discharge tubes, at contacts SP3 prepares a circuit for relay CA and at contacts SP4 opens a point in the circuit of relay ST. The release of the bridge magnet also removes earth from the lead BMI so that relay BP now releases and interrupts the circuit of the select magnet and also completes a circuit for relay CA. This thereupon prepares a circuit for relay CO which however is short-circuited as long as the initial circuit for relay CA remains closed. The release of the select magnet removes earth from lead SMI so that relay SP releases and by opening contacts SP3 permits relay CO to operate in series with relay CA. Thereupon at contacts CO1 is prepares a circuit for the bridge magnet BM1 of the finder switch, at contacts CO2 connects 50 v. positive to lead STF instead of lead STL, at contacts CO3 opens another point in the circuit of relay ST and at contacts CO4 opens a point in the initial circuit for relay CA.

It will be understood that the operation of the connector switch as just described only takes place if the test on the called subscriber's line shows him to be idle as evidenced by the appropriate marking on the register track. When the connection is extended by the operation of the connector switch, ringing current is applied to the called line in series with the right-hand winding of the ring trip relay F. This relay operates in usual manner with the called party replies, locks up by way of its left-hand winding by removing the short-circuit at contacts F1 and at contacts F2 and F3 completes the speaking circuit.

In the meantime the release of relay SP at contacts SP1 completes a circuit for the bridge magnet BM1 of the finder and this operates and by earthing lead BMI energises relay BP which prepares a circuit for the appropriate gas discharge tube. Moreover the application of positive to lead STF has signalled the manipulator which thereupon by means of memory circuit M9 as already described transmits a pulse over lead PU in the time position corresponding to the calling party. This causes the appropriate tube to strike and since relay BP is already operated, the select magnet also is operated at this time. It then connects earth to lead SMI to energise relay SP which as before releases the bridge magnet and on this occasion releases relay ST. Relays CA, CO and SP are then also released and the distributor equipment is available for setting up another connection. The connection is thus completed to the calling party's line and when the wanted party replies, the subscribers may converse.

When the conversation is completed and both parties replace their receivers, circuits not shown but assumed to be similar to those disclosed in the co-pending application of G. T. Baker Serial No. 300,431, filed July 23, 1952, cause the manipulator to transmit an impulse which effects momentary reoperation of the bridge magnets of both the finder and connector switches, whereupon the select fingers are released and the apparatus is therefore restored to normal.

I claim:

1. In a telephone system, a calling line, a called line, a drum having a surface of magnetic material, means for rotating said drum about its axis at a substantially constant speed, means controlled over said calling line for recording the number of said called line on a circumferential track on said drum, a crossbar switch and means responsive to the record of said called number on said track for operating said crossbar switch to extend connection to said called line.

2. In a telephone system, a calling line, a called line, a drum having a surface of magnetic material, means for rotating said drum about its axis at a substantially constant speed, means controlled over said calling line for recording the number of said called line on a circumferential track on said drum, means for making a record characteristic of said calling line on a circumferential track on said drum, a first selector switch, a second selector switch associated therewith, means responsive to the record of said called number for operating said first selector switch to extend connection to said called line and means responsive to the characteristic record of said calling line for operating said second selector switch to connect with said calling line.

3. In a telephone system, a calling line, a called line, a drum having a surface of magnetic material, means for rotating said drum about its axis at a substantially constant speed, means controlled over said calling line for recording the number of said called line on a circumferential track on said drum in a position characteristic of said calling line, a first selector switch, a second selector switch associated therewith, means controlled responsive to the record of said number for operating said first selector switch to extend connection to said called line and means responsive to the position of the record of said number for operating said second selector switch to connect with said calling line.

4. In a telephone system, a calling line, a plurality of called lines, a drum having a surface of magnetic material, means for rotating said drum about its axis at a substantially constant speed, means controlled over said calling line, for recording the number of said called line on a first circumferential track on said drum in a position characteristic of said calling line, a second circumferential track on said drum having records of the numbers of said plurality of called lines, means for comparing said number recorded on said first track with said numbers recorded on said second track, a first selector switch, a second selector switch associated therewith, means controlled responsive to the position in said second track in which identity is found for operating said first selector switch to extend connection to said called line and means responsive to the position of the record of said number in said first track for operating said second selector switch to connect with said calling line.

5. In a telephone system, a calling line, a called line, a drum having a surface of magnetic material, means for rotating said drum about its axis at a substantially constant speed, means controlled over said calling line for recording the number of said called line on a circumferential track on said drum, a crossbar switch, a control lead, means for selectively connecting potential to said control lead in a characteristic time relation in accordance with said recorded number, and means for selectively operating said first crossbar switch in accordance with said characteristic connection of potential to said control lead to extend connection to said called line.

6. In a telephone system, a calling line, a called line, a drum having a surface of magnetic material, means for rotating said drum about its axis at a substantially constant speed, means controlled over said calling line for recording the number of said called line on a circumferential track on said drum, means for making a record characteristic of said calling line on a circumferential track on said drum, a first crossbar switch, a second crossbar switch associated therewith, a control lead, means for selectively connecting potential to said control lead in a characteristic time relation in accordance with said recorded number, means for selectively operating said first crossbar switch in accordance with said characteristic connection of potential to said control lead to extend connection to said called line, means for selectively connecting potential to said control lead in a characteristic time relation in accordance with said characteristic record and means for selectively operating said second crossbar switch in accordance with said characteristic connection of potential to said control lead to extend connection to said calling line.

7. In a telephone system, a drum having a surface of magnetic material, means for rotating said drum about its axis at a substantially constant speed, a plurality of lines, means for making records respectively characteristic of said lines when in calling condition on a circumferential track on said drum, a source of pulses, a cyclic counter operated from said pulse source, a plurality of switching leads, a control lead, means associated with said drum for connecting potential to said control lead in a characteristic time relation dependent on which line is in calling condition and means controlled by said counter whereby the characteristic connection of potential to said control lead results in the connection of potential to a particular one of said switching leads.

8. In a telephone system, a calling line, a called line, a drum having a surface of magnetic material, means for rotating said drum about its axis at a substantially constant speed, means controlled over said calling line for recording the number of said called line on a circumferential track on said drum, a source of pulses, a cyclic counter operated from said pulse source, a plurality of switching leads, a control lead, means associated with said drum for connecting potential to said control lead in a characteristic time relation dependent on said number recorded on said drum and means controlled by said counter whereby the characteristic connection of potential to said control lead results in the connection of potential to a particular one of said switching leads.

9. In a telephone system, a line, a drum having a surface of magnetic material, means for rotating said drum about its axis at a substantially constant speed, means for making a record characteristic of said line on a circumferential track on said drum, a crossbar switch, a source of pulses, a cyclic counter operated from said pulse source, a plurality of switching leads, a control lead, means associated with said drum for connecting potential to said control lead in a characteristic time relation dependent on said number recorded on said drum, means controlled by said counter whereby the characteristic connection of potential to said control lead results in the connection of potential to a particular one of said switching leads and means controlled over said one switching lead for causing said crossbar switch to extend connection to said line.

10. In a telephone system, a drum having a surface of magnetic material, means for rotating said drum about its axis at a substantially constant speed, a plurality of lines, means for making records respectively characteristic of said lines when in calling condition on a circumferential track on said drum, a crossbar switch, a source of pulses, a cyclic counter operated from said pulse source, a plurality of switching leads, a control lead, means associated with said drum for connecting potential to said control lead in a characteristic time relation dependent on which line is in calling condition, means controlled by said counter whereby the characteristic connection of potential to said control lead results in the connection of potential to a particular one of said switching leads and means controlled over said one switching lead for causing said crossbar switch to extend connection to the appropriate calling line.

11. In a telephone system, a drum having a surface of magnetic material, means for rotating said drum about its axis at a substantially constant speed, a plurality of lines, means for making a record characteristic of any particular line on a circumferential track on said drum, a source of pulses, a cyclic counter operated from said pulse source, a plurality of three-electrode gas discharge tubes, means controlled by said counter for connecting potential in turn to the trigger electrodes of said tubes, a plurality of switching leads extending respectively from the cathodes of said tubes, a control lead connected to the trigger electrodes of all said tubes and means associated with said drum for connecting potential to said control lead in a characteristic time relation dependent on said record on said drum whereby a particular one of said tubes is caused to strike and potential is connected to a particular one of said switching leads.

12. In a telephone system, a drum having a surface of magnetic material, means for rotating said drum about its axis at a substantially constant speed, a plurality of lines, means for making a record characteristic of any particular line on a circumferential track on said drum, a crossbar switch including a driving member, a plurality of operating bars and a plurality of coupling magnets for coupling said operating bars respectively to said driving member, a source of pulses, a cyclic counter operated from said pulse source, a plurality of three-electrode gas discharge tubes, means controlled by said counter for connecting potential in turn to the trigger electrodes of said tubes, connections extending respectively from the cathodes of said tubes to said coupling magnets, a control lead connected to the trigger electrodes of all said tubes and means associated with said drum for connecting potential to said control lead in a characteristic time relation dependent on said record on said drum whereby a particular one of said tubes is caused to strike and operate the associated coupling magnet in series therewith thereby causing said crossbar switch to connect with said line.

13. In a telephone system, a plurality of lines, a drum having a surface of magnetic material, means for rotating said drum about its axis at a substantially constant speed, means controlled over a calling one of said lines for registering the number of a called one of said lines on a circumferential track on said drum, an automatic switch, means for continuously recording on said drum the busy or idle condition of said plurality of lines and means responsive to said record if said called line is idle for causing said automatic switch to connect with said called line.

14. In a telephone system, a calling line, a called line, a register device, means controlled over said calling line for registering the number of said called line in said register device, a control lead extending from said register device, a first crossbar switch, a second crossbar switch associated therewith, means controlled by said register device for testing said called line for busy or idle condition, means in said register device responsive to the idle condition of said line for applying potential to said control lead at a characteristic instant of time to cause said first crossbar switch to connect with said called line and further means in said register device for applying potential to said control lead at a characteristic instant of time to cause said second crossbar switch to connect with said calling line.

15. In a telephone system, a calling line, a called line, a drum having a surface of magnetic material, means for rotating said drum about its axis at a substantially constant speed, means controlled over said calling line for registering the number of said called line on a circumferential track on said drum, a first crossbar switch, a second crossbar switch associated therewith, means for continuously recording on said drum the busy or idle condition of said called line, means responsive to said record if said called line is idle for causing said first crossbar switch to connect with said called line and means controlled by said register for thereafter causing said second crossbar switch to connect with said calling line.

16. In a telephone system, a calling line, a called line, a drum having a surface of magnetic material, means for rotating said drum about its axis at a substantially constant speed, means controlled over said calling line for registering the number of said called line on a circumferential track on said drum, a control lead, a first crossbar switch, a second crossbar switch associated therewith, means for continuously recording on said drum the busy or idle condition of said called line, means controlled by said drum responsive to said record if said called line is idle for applying potential to said control lead at a characteristic instant of time to cause said first crossbar switch to connect with said called line and further means controlled by said drum for thereafter applying potential to said control lead at a characteristic instant of time to cause said second crossbar switch to connect with said calling line.

17. In a telephone system, a calling line, a called line, a drum having a surface of magnetic material, means for rotating said drum about its axis at a substantially constant speed, means controlled over said calling line for registering the number of said called line on a circumferential track on said drum, a first selector switch, a second selector switch associated therewith, and control means associated with said drum including means for testing said called line for busy or idle condition, means responsive to the idle condition of said called line for causing said first selector switch to connect therewith and means for thereafter causing said second selector switch to connect with said calling line.

References Cited in the file of this patent

UNITED STATES PATENTS

| | | | |
|---|---|---|---|
| 2,082,911 | Schneckloth | June 8, 1937 |
| 2,573,889 | Boswau | Nov. 6, 1951 |
| 2,615,971 | Malthaner | Oct. 28, 1952 |
| 2,664,467 | den Hertog | Dec. 29, 1953 |
| 2,668,876 | Gohorel | Feb. 9, 1954 |
| 2,679,551 | Newby | May 25, 1954 |
| 2,679,552 | Jacobaeus | May 25, 1954 |
| 2,680,155 | Molnar | June 1, 1954 |
| 2,738,382 | Brooks | Mar. 13, 1956 |
| 2,761,907 | Gohorel | Sept. 4, 1956 |